United States Patent [19]

Doty

[11] 3,951,107
[45] Apr. 20, 1976

[54] ANIMAL FEEDER

[76] Inventor: Harry D. Doty, R No. 2 Box 174, Harrison, Ohio 45030

[22] Filed: Dec. 12, 1974

[21] Appl. No.: 532,196

[52] U.S. Cl. .............................. 119/52 R; 119/53.5
[51] Int. Cl.² ............................................ A01K 5/00
[58] Field of Search ............... 119/52 R, 52 A, 53.5, 119/54, 53

[56] References Cited
UNITED STATES PATENTS

| | | | |
|---|---|---|---|
| 1,239,116 | 9/1917 | Linquist | 119/54 |
| 1,399,716 | 12/1921 | Riner | 119/53.5 |
| 1,926,641 | 9/1933 | White | 119/53.5 |

*Primary Examiner*—Louis G. Mancene
*Assistant Examiner*—J. N. Eskovitz
*Attorney, Agent, or Firm*—Melville, Strasser Foster & Hoffman

[57] ABSTRACT

An animal feeding device for delivering feed to animals and particularly for delivering feed to pigs and the like. The feeder includes an open lid hopper having a swingable front partition, operable by an animal, the upper section of which is downwardly disposed from the horizontal by at least the angle of repose of the feed. The lower section of the partition, with no external forces applied thereto, is maintained in parallel spaced relationship with respect to a vertical rear wall. The hopper communicates with a feed trough having a rear portion upwardly disposed from its substantially horizontal base portion by at least the angle of repose of the feed. The rear portion of the trough also serves as a deflecting device for feed passing from the hopper into the trough. Also included are a plurality of low profile divider bars having a loose fit extension into the hopper for agitating the feed. The low profile divider bars also serve to partition the trough into sections and to prevent both feed contamination and injury to the animal utilizing the feeder.

12 Claims, 5 Drawing Figures

U.S. Patent April 20, 1976 3,951,107
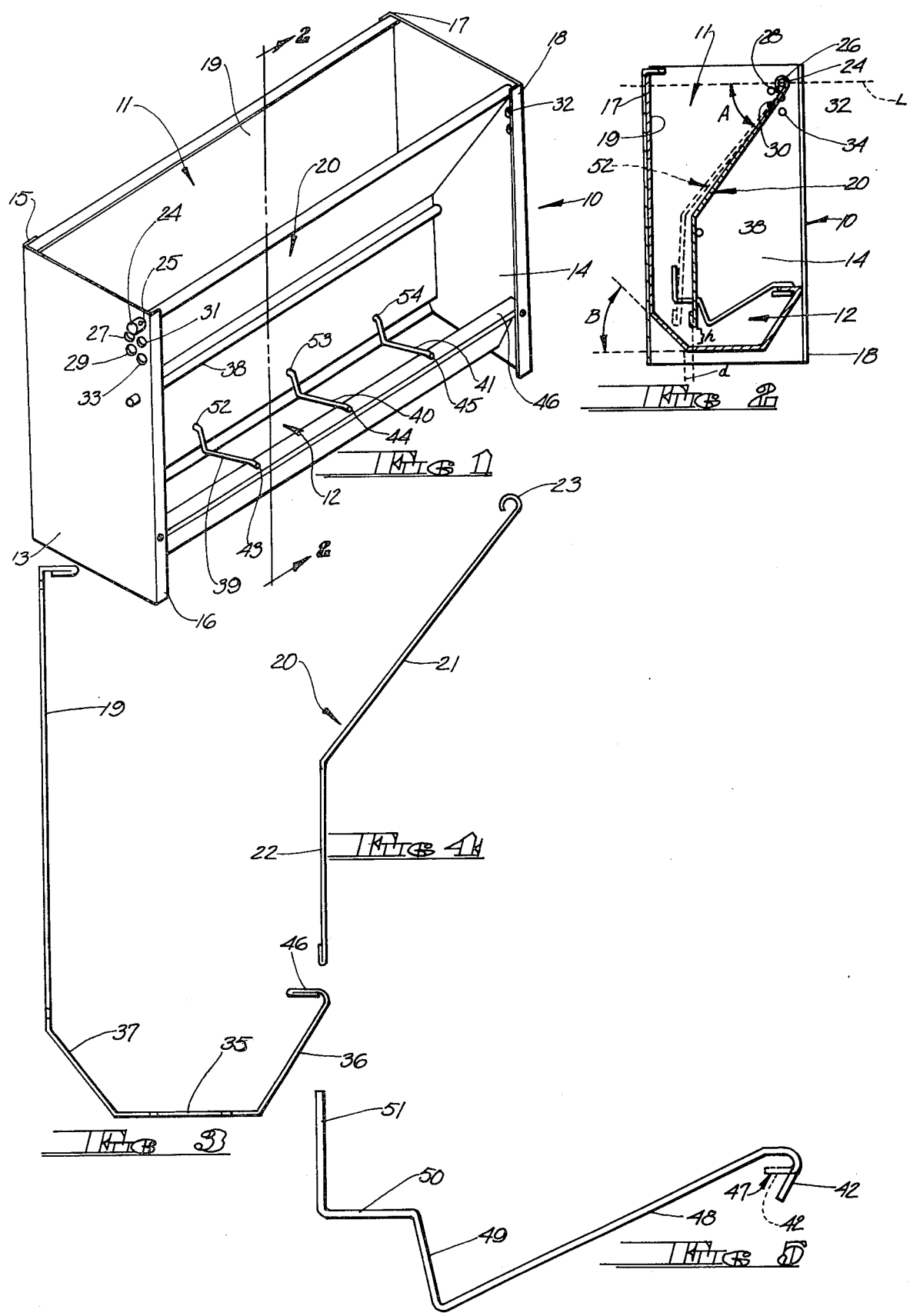

3,951,107

ANIMAL FEEDER

BACKGROUND OF THE INVENTION

The invention relates to an animal feeding device, and more particularly to such a device for delivering feed to pigs and the like in controlled amounts.

In order to economically raise livestock, especially for the market, it is highly desirable to provide the animals with a continuous supply of fresh feed. Prior art feeder devices directed toward achieving this result generally include an open lid hopper for receiving a supply of feed and a feeding-trough communicating with the hopper, the feed passing from the hopper to the trough for consumption by the animals. To insure a free flow of the feed from the hopper to the trough the prior art discloses numerous hopper-trough configurations including various agitation means to prevent feed bridging and lodging in the passageways of the feeder. In addition, the prior art feeder assemblies attempt to teach means for eliminating feed contamination and feed spoilage. However, the prior art does not disclose an animal feeder which satisfactorily achieves these results.

Shortcomings in the prior art animal feeder can be characterized by the following related deficiencies; (1) excessive feed flow, (2) feed contamination, (3) the use of mechanical devices, (4) animal trapping and (5) imcomplete feed clean out. The problem of excessive feed flow results from an overly responsive feed action mechanism, generally actuatable by an animal, causing an excess accumulation of feed in the eating area. This excess accumulation of feed eventually leads to feed waste and contamination. The problem of feed contamination is further increased by open eating areas where troughs without dividers or, toughs equipped with high profile dividers, allow feed rooting by the animals. As previously mentioned, the prior art discloses the use of various agitation means for facilitating the flow of feed from the hopper to the trough. However, since these agitation means are generally mechanical devices which are subject to corrosion by moisture, salt in the feed, animal saliva and manure acids they further add to the problem of feed contamination and, in addition, require continual maintenance to remain in operable condition.

Another problem associated with the prior art feeder assemblies is that of animal trapping. The prior art frequently discloses the use of hopper panels which are swingable at relatively large angles by feeding animals, generally in association with an attached agitator, and the use of divider straps which are located high over the eating area to partition the troughs into separate eating sections. It has been found from experience that both of these features often serve to physically trap an animal within the eating area of the feeder. The final prior art deficiency is that of incomplete feed clean out. Incomplete feed clean out occurs when feed becomes lodged within the hopper passage way leading to the trough and cannot be disrupted therefrom in the normal course of activities. The prior art design deficiencies which cause incomplete feed clean out include a deflection surface intermediate the hopper and trough having too shallow of a slope wherein the angle of the slope is less than the angle of repose of the feed and hoppers having large inlets tapering down to smaller passage ways wherein feed frequently becomes compacted and accumulatively lodged.

SUMMARY OF THE INVENTION

It is an object of the present invention to provide an animal feeding device adapted to continuously deliver a controlled amount of feed to an animal eating area. By providing a controlled amount of feed flow, feed contamination and spoilage is greatly reduced.

It is a further object of the present invention to provide means in an animal feeder which eliminates the problem of feed contamination due to animal rooting. Yet another object of the present invention is to provide an animal feeder having virtually no mechanical devices so as to largely reduce feed contamination and frequent feeder maintenance due to corrosion.

Still another object of the present invention is to provide an animal feeder exhibiting a minimum propensity for trapping feeding animals.

A final specific object of the present invention is to provide an animal feeder wherein complete feed clean out from the feeder hopper to the feeder trough is greatly facilitated.

In accordance with these and other useful objects there is provided an animal feeder having an open lid hopper in communication with a downwardly depending trough eating area. The hopper comprises a pair of oppositely facing side walls, a vertical rear wall extending therebetween and a swingable V-shaped front partition. The swingable front partition, which is operable by a feeding animal, is hingedly secured to the side walls with the upper section thereof being downwardly disposed toward the hopper rear wall by at least the angle of repose of the feed in use. The lower section of the swingable front partition, when undisturbed by feeding animals, is maintained in a parallel spaced relationship with respect to the vertical rear wall by a stop secured to the side walls on the outside of the hopper.

The trough is located beneath the hopper and includes a rear portion depending from the vertical rear wall and upwardly disposed from the trough's substantially horizontal base portion by at least the angle of repose of the feed.

The front portion of the feeder trough projects upwardly and outwardly from the feeder base and includes a transverse edge, intermediate the feeder side walls, having a plurality of eye means. A plurality of low profile divider bars having hooked means at one end thereof for engagement with a respective eye slope downwardly from the trough front portion edge and make a loose fit extension into the hopper.

The lower section of the swingable front partition is maintained at a predetermined height above the trough base portion and at a predetermined distance behind the trough rear portion so that, in conjunction with the various slopes of the hopper and trough walls, a controlled feed flow is achieved. Also, the low profile divider bars are maintained in close proximity to the trough base portion so as to reduce animal rooting and trapping problems. Finally, the divider bar extensions in the hopper along with the inwardly swingable front partition function as agitator means to assure complete feed clean out in the hopper portion of the feeder.

BRIEF DESCRIPTION OF THE DRAWINGS

FIG. 1 is a perspective view of the assembled animal feeder of the present invention.

FIG. 2 is a cross-sectional side elevation view of the animal feeder of the present invention taken along the line 2—2 of FIG. 1.

FIG. 3 is a side elevation view of the trough and vertical rear wall assembly of the animal feeder of the present invention.

FIG. 4 is a side elevation view of the swingable front partition of the animal feeder of the present invention.

FIG. 5 is a side elevation view of one of the low profile divider bars of the animal feeder of the present invention.

DESCRIPTION OF THE PREFERRED EMBODIMENTS

Referring to the drawings, wherein like numerals identify corresponding components, FIG. 1 shows, in perspective, the animal feeder of the present invention generally indicated at 10. The feeder 10 comprises a hopper generally indicated as at 11 and a trough generally indicated as at 12. Two opposedly facing said walls 13 and 14 provide support for the feeder 10 and serve to define the transverse dimensions of the hopper 11 and trough 12. The side wall 13 may include flanged members 15 and 16 to facilitate securement thereto of the hopper 11 and trough 12 by suitable means such a rivoting. Similarly, side wall 14 may include flanged members 17 and 18.

The hopper 11, in addition to the side walls 13 and 14, includes a vertical rear wall 19 and a swingable V-shaped partition 20 having an upper section 21 and a lower section 22. The upper section 21 of the front partition 20 terminates in a hook means 23 adapted to hingedly engage a pivot rod 24 extending through a pair of axially aligned apertures 25 and 26 in respectively side walls 13 and 14. Additional axially aligned aperture pairs, such as 27 and 28, 29 and 30, 31 and 32 and 33 and 34, may be included in the side walls 13 and 14 to provide a height adjustment capability for the front partition 20.

The trough 12 includes a substantially horizontal base portion 35, an upwardly and outwardly projecting front portion 36 and a rear portion 37 depending from the vertical rear wall 19 and angularly disposed from the base portion 35.

In order to assure a free flow of feed from the hopper 11 to the trough 12 it has been discovered that all surfaces associated with feed travel should have slopes at least that of the angle of repose of the feed. The angle of repose is an inherent characteristic of a bulk material, relating to its flowability, and is measured by the angle that the surface of a normal, freely formed pile of the material makes to the horizontal. The angle of repose of fine ground feed or high moisture corn is approximately 40° and will therefore slide freely on an incline plane of 45° or more. Accordingly, a stop rod 38, extending intermediate the side walls 13 and 14 and secured thereto, is positioned adjacent the front partition lower section 22 such that, when no external forces are applied to the front partition 20 by feeding animals, the stop rod 38 will be in abutment with the front partition lower section 22. The front partition 20 is appropriately configured so that when it abuts the stop rod 38 the upper section 21 will be downwardly disposed from the horizontal (indicated by dotted line L) by at least the angle of repose of the feed, see angle A in FIG. 2, while the lower section 22 is maintained in parallel spaced relationship with respect to the vertical rear wall 19. Furthermore, the trough 12 is configured so that the rear portion 37 is disposed from the base portion 35, see angle B of FIG. 2, by at least the angle of repose of the feed. It has been found that excellent feed flow is achieved by configuring the feeder 10 so as to make angle A equal approximately 60° and angle B approximately 45°. In this manner, the 60° slope of the top section 21, the 90° straight fall or parallel configuration of the rear wall 19 with respect to the lower section 22 and the 45° slope of the trough rear portion 37 are all greater than the angle of repose of the feed and will allow the feed to flow freely from the hopper 11 passed the trough rear portion 37, which serves as a deflection surface, and to the horizontal portion 35 of the trough 12.

The amount of feed delivered to the trough 12 for comsumption by feeding animals is controlled by the height $h$ of the front partition lower section 22 above the horizontal base portion 35 of the trough 12. The height $h$ can be adjusted to a desired level by extending the pivot rod 24 through an appropriate pair of the plurality of apertures 27 through 34. It is clearly evident that by increasing the height $h$ the amount of feed being delivered from the hopper 11 to the trough 12 is increased. Since excessive feed in the trough 12 frequently leads to spoilage and contamination, the height $h$, is preferably adjusted so that the feed can accumulate only part way along the trough base portion 35. Furthermore, in order to insure that the only factors effecting feed flow control are the angle of repose of the feed and the height $h$, the front partition lower section 22 must terminate over the trough base portion 35. In other words, the front partition 20 and the stop rod 38 must be so configured as to insure the existance of distance $d$, see FIG. 2, along the trough base portion 35.

A plurality of low profile divider bars 39, 40 and 41 are provided for a triad of purposes. Initially, the divider bars 39, 40 and 41 are located in close proximity to the trough base portion 35 so as to prevent feed contamination by animal rooting. In addition, the divider bars 39, 40 and 41 serve as agitation means for feed in the hopper 11 and also serve as a stop for the inwardly swingable front partition 20.

Each of the low profile divider bars 39, 40 and 41 has a hook portion 42 extending through a respective one of a pluarility of eyes 43, 44 and 45 located in the edge 46 of the trough front portion 36. In order to secure each divider bar to its respective eye the hook portion 42 is bent to a position such as shown at 47 in FIG. 5. Each of the low profile divider bars 39, 40 and 41 include four main sections 48, 49, 50 and 51 (see FIG. 5). The first section 48 of each divider bar slopes downwardly from the edge 46 to a point in close proximity to the trough base portion 35. From this latter position a second section 49 extends substantially upwards to a level wherein it is in alignment with a respective one of the apertures 52, 53 and 54 located in the lower portion of the front partition lower section 22. A third section 50 then makes a substantially horizontal loose fit extension through a respective one of the apertures 52, 53 and 54 terminating at a location intermediate the vertical rear wall 19 and the front partition 20. A final or fourth section 51 extends substantially vertically from this latter location intermediate the vertical rear wall 19 and the front partition 20.

To expose the full eating area, i.e., the base portion 35 and the rear portion 37 of the trough 12, of the feeder 10 a feeding animal must abut against the front partition 20 causing it to assume a position as shown at 52. In addition to making available the entire feeding area to the animal this swinging action of the front partition also disturbs any feed lodged in the hopper 11 allowing it to freely flow to the eating area. The fourth section 51 of the low profile divider bars 39, 40 and 41 serve as a stop means to control the extent of potential swing of the front partition 20. Further agitation of feed stored in the hopper 11 is provided by movements of divider bar sections 50 caused by feeding animals coming into contact with divider bar sections 48. The loose fit extensions of divider bar sections 50 through apertures 52, 53 and 54 facilitate the movement of divider bar sections 51 in the hopper 11.

The low profile divider bars 39, 40 and 41 can be constructed in the form of round wire bars which are physically uncomfortable to smaller animals to prevent the latter from laying in the eating area and thereby contaminating the feed. Also, since the divider bars 39, 40 and 41 are located in close proximity to the trough base portion 35, comtamination of feed resulting from animals rooting feed from one trough section to another is prevented.

The low profile design of divider bars 39, 40 and 41 also serve to reduce the possibility of animal trapping in the trough 12 since the average size animal will not be able to lodge himself underneath the bars. Furthermore, due to the relatively small opening between the front partition lower section 22 and the trough base portion 35 the average size animal will not be able to burrow his head into the hopper 11 area and become entrapped therein.

The details described herein have been by way of example only and it will be understood that many modifications may be made without departing from the spirit of the invention. Therefore, no limitations not expressly set forth in the claims is intended or should be implied.

The embodiments of the invention in which an exclusive property or privelege is claimed are defined as follows:

1. An animal feeder for delivering feed comprising:
   a. a pair of opposedly facing side walls each having an upper and a lower end,
   b. a trough extending between said side walls and secured thereto at said lower ends, said trough having a substantially horizontal base portion with front and rear portions projecting upwardly and outwardly therefrom,
   c. a vertical rear wall extending between said side walls and upwardly from the outermost edge of said trough rear portion,
   d. stop means secured to at least one of said side walls, and
   e. a partition extending between said side walls, said partition having an upper section and a lower section, said upper section being hingedly secured to said side walls at a position near said upper ends thereof and opposite said vertical rear wall, said partition having a normal position when no external forces are applied thereto wherein the side thereof facing away from said vertical rear wall is in abutment with said stop means such that said upper section is angularly disposed downwardly and rearwardly from a horizontal through said hinged position, said lower section extending downwardly from the rearwardmost edge of said upper section in parallel spaced relationship with said vertical rear wall part way into said trough such that it would intersect said trough base portion at a point near said trough rear portion whereby, said partition is swingable between said normal position and a second position wherein said partition approaches said rear wall.

2. An animal feeder in accordance with claim 1, wherein said stop means comprises a support rod horizontally extending between said side walls and fixedly secured thereto, said support rod being in abutment with said lower section of said partition at a location near said rearward most edge of said upper section when said partition is in said normal position.

3. An animal feeder in accordance with claim 1, including an axially aligned first aperture in each of said side walls at said hinged positions thereof, a pivot rod extending between said side walls and through said axially alinged first apertures, and a looped section terminating the forward most edge of said partition upper section, said looped section swingably engaging said pivot rod whereby said partition is hingedly secured to said side walls.

4. An animal feeder in accordance with claim 3 including a plurality of additional pairs of axially aligned apertures in said side walls at said hinged position thereof, each pair of said additional axially aligned apertures being adapted to receive said pivot rod such that each of said axially aligned aperture pairs defines a different level of extension of said partition lower section part way into said trough.

5. An animal feeder in accordance with claim 1 wherein said trough rear portion is disposed from said trough base portion by approximately 45°.

6. An animal feeder in accordance with claim 1, wherein in said normal position of said partition said upper section thereof is disposed from said horizontal through said hinged position by approximatley 60°.

7. An animal feeder in accordance with claim 1, including at least one aperture in said partition lower section, said at least one aperture being located slightly above the edge of said lower section extending into said trough, and at least one divider bar secured to the outer most edge of said trough front portion and sloping downwardly therefrom towards said partition, said at least one divider bar having a loose fit extension through said at least one aperture to a point intermediate said partition and said vertical rear wall.

8. An animal feeder in accordance with claim 7 wherein said at least one divider bar comprises a first section having first and second ends, said first section having said first end thereof secured to said outer most edge of said trough front portion and sloping downwardly therefrom toward said partition such that said second end of said divider bar first section is located below said at least one aperture and on the side of said partition facing away from said vertical rear wall, a second section extending substantially upward from said second end of said divider bar first section and terminating at a point in alignment with said at least one aperture, a third section having a loose fit extension from said termination of said second section substantially horizontally through said at least one aperture and terminating at a point intermediate said partition and said vertical rear wall and a fourth section extending substantially upwardly from said termination of said divider bar third section, said fourth section being substantially in parallel spaced relationship with said vertical rear wall whereby said partition is swingable between said normal position and a position defined by the location of said divider bar fourth section.

9. An animal feeder in accordance with claim 8, wherein said outer most edge of said trough front portion includes at least one eye and said first end of said at least one divider bar first section includes a hook means, said hook means of said divider bar first section being adapted to engage said at least one eye whereby said divider bar first section is secured to said outer most edge of said trough front portion.

10. An animal feeder in accordance with claim 7, wherein said at least one divider bar comprises a round wire bar in close proximity to said trough base portion.

11. An animal feeder in accordance with claim 7 wherein said at least one aperture comprises a plurality of apertures substantially evenly spaced along the length of said partition lower section and said at least one divider bar comprises a respective plurality of divider bars.

12. An animal feeder for delivering feed comprising:
   a. a pair of opposedly facing side walls each having an upper and a lower end;
   b. a trough extending between said side walls and secured thereto at said lower ends, said trough having a substantially horizontal base portion with front and rear portions projecting upwardly and outwardly therefrom,
   c. a vertical rear wall extending between said side walls and upwardly from the outermost edge of said trough rear portion,
   d. a partition extending between said side walls, said partition having an upper section and a lower section, said upper section being secured to said side walls at a position near said upper ends thereof and opposite said vertical rear wall, said upper section being angularly disposed downwardly and rearwardly from a horizontal through said secured position and said lower section extending downwardly from the rearwardmost edge of said upper section in parallel spaced relationship with said vertical rear wall part way into said trough such that it would intersect said trough base portion at a point near said trough rear portion, said partition lower section having at least one aperture located slightly above the edge of said lower section extending into said trough, and
   e. at least one divider bar secured to the outermost edge of said trough front portion and sloping downwardly therefrom toward said partition, said at least one divider bar having a loose fit extension through said aperture to a point intermediate said partition and said vertical rear wall.

* * * * *